(12) United States Patent
Andelkovic et al.

(10) Patent No.: US 11,494,251 B2
(45) Date of Patent: Nov. 8, 2022

(54) COMPUTER METHOD AND A COMPUTER DEVICE FOR ANALYZING COMPUTER IMPLEMENTED APPLICATIONS

(71) Applicant: KING.COM LIMITED, St. Julians (MT)

(72) Inventors: Alexander Andelkovic, Stockholm (SE); Alice Reinaudo, Stockholm (SE); Sara Karimi, Stockholm (SE)

(73) Assignee: KING.COM LTD., St. Julians (MT)

( * ) Notice: Subject to any disclaimer, the term of this patent is extended or adjusted under 35 U.S.C. 154(b) by 103 days.

(21) Appl. No.: 16/445,621

(22) Filed: Jun. 19, 2019

(65) Prior Publication Data
US 2020/0401469 A1   Dec. 24, 2020

(51) Int. Cl.
| | |
|---|---|
| *G06F 11/00* | (2006.01) |
| *G06F 11/07* | (2006.01) |
| *G06F 9/451* | (2018.01) |
| *G06K 9/62* | (2022.01) |
| *G06V 10/75* | (2022.01) |

(52) U.S. Cl.
CPC ........... *G06F 11/079* (2013.01); *G06F 9/451* (2018.02); *G06F 11/0706* (2013.01); *G06F 11/0751* (2013.01); *G06K 9/6215* (2013.01); *G06V 10/751* (2022.01)

(58) Field of Classification Search
None
See application file for complete search history.

(56) References Cited

U.S. PATENT DOCUMENTS

| 10,043,255 | B1 * | 8/2018 | Pathapati | G06K 9/00483 |
| 2011/0276946 | A1 * | 11/2011 | Pletter | G06F 11/3688 |
| | | | | 717/124 |
| 2012/0198351 | A1 * | 8/2012 | Lee | G06F 11/3688 |
| | | | | 715/744 |
| 2012/0243745 | A1 * | 9/2012 | Amintafreshi | G06F 11/3688 |
| | | | | 382/103 |

OTHER PUBLICATIONS

Google Scholar/Patents—text refined (Year: 2021).*
Google Scholar/Patents—text refined (Year: 2022).*
Google Scholar/Patents search—text refined (Year: 2022).*

* cited by examiner

*Primary Examiner* — Christopher S McCarthy
(74) *Attorney, Agent, or Firm* — Saul Ewing Arnstein & Lehr LLP

(57) ABSTRACT

A computer implemented method comprises analysing data defining the first image which is displayable when a computer application runs to determine at least one candidate user interactive area in the image. A user interactive area is one which is responsive to user input when the computer application is run. The method comprises attempting to interact with the determined at least one candidate user interactive area and comparing the data defining the first image with data defining a further image to determine if the respective candidate user interactive area is an interactive area.

23 Claims, 16 Drawing Sheets

COMPUTER METHOD AND A COMPUTER DEVICE FOR ANALYZING COMPUTER IMPLEMENTED APPLICATIONS

FIELD OF THE INVENTION

The present application relates to a computer implemented method and a computer device and in particular but not exclusively for the analyzing of at least part of a computer implemented application.

BACKGROUND OF THE INVENTION

The advent of the internet, and other wide area networks, has led to a proliferation of connected user or client devices, typically running services and associated installations from providers of the user's choice. Such installations may be referred to as apps. There are many different examples of apps such as gaming apps, social apps, entertainment apps, music apps, navigation apps, health apps and many other types of apps.

One example of such apps may be gaming related.

One technical challenge relates to the scenario where one or more changes are made to an app and verifying that the app works correctly. There may be technical challenges in ensuring that the app works correctly across a wide range of different devices.

One technical challenge relates to the scenario relates to where a new app is provided and the operation of the app needs to be verified. One technical challenge may relate to the problem in determining that the graphical user interface GUI of an application is functioning in accord with the processes running on at least one processor within a computer implemented device.

This patent specification describes not only various ideas and functions, but also their creative expression. A portion of the disclosure of this patent document therefore contains material to which a claim for copyright is made and notice is hereby given: Copyright King.com Limited 2019 (pursuant to 17 U.S.C. 401). A claim to copyright protection is made to all screen shots, icons, look and feel and all other protectable expression associated with the games illustrated and described in this patent specification.

SUMMARY OF DISCLOSURE

According to an aspect, there is provided a computer implemented method comprising: analysing by at least one processor of a computer device data defining the first image which is displayable when a computer application runs to determine at least one candidate user interactive area in the image, a user interactive area being one which is responsive to user input when the computer application is run; causing at least one processor of the computer device to attempt to interact with the determined at least one candidate user interactive area; and comparing by the at least one processor of the computer device the data defining the first image with data defining a further image to determine if the respective candidate user interactive area is an interactive area.

The method may comprise causing the further image to be displayable in response to the attempt to interact with the determined at least one candidate user interactive area The method may comprise running the computer application on at least one of the at least processor of the computer device and at least one processor of another computer device.

The method may comprise capturing at least one of the data defining the first image and the further image.

The method may comprise causing at least one of the first image and the further image to be displayed on a display.

The method may comprise determining if the respective candidate area is an interactive area by determining a similarity between the first and further images.

The method may comprise determining if the respective candidate area is an interactive area by determining if the first and further images are substantially different.

The method may comprise carrying out the method steps for a plurality of different images displayable when the computer application runs to provide a tree relationship between the different images which is displayable.

The method may comprise storing the tree relationship.

The method may comprise subsequently generating a further tree relationship.

The method may comprise comprising analysing the tree relationship to determine one or more anomalies.

The method may comprise comparing at least a part of the provided tree relationship with a corresponding reference tree relationship to determine one or more anomalies.

The tree relationship may be a tree structure.

The method may comprise carrying out the method steps for a plurality of different images displayable when the computer application runs to provide a hierarchal relationship between the different images which is displayable The method may comprise storing the hierarchal relationship.

The method may comprise subsequently generating a further hierarchal relationship.

The method may comprise comprising analysing the hierarchal relationship to determine one or more anomalies.

The method may comprise comparing at least a part of the provided hierarchal relationship with a corresponding reference hierarchal relationship to determine one or more anomalies.

The method may comprise providing at least one file, the at least one file comprising data defining a plurality of different images displayable when the computer application runs.

The method may comprise analysing data defining one or more of a plurality of different images displayable when the computer application runs to determine an error condition.

The error condition may comprise one or more of missing text information and missing texture information.

According to another aspect, there is provided a computer implemented method comprising: running on at least one processor of a computer device a computer application; capturing by at least one processor of the computer device data defining a first screenshot of an image caused to be displayed on a display of the device by the computer application; analysing by at least one processor of the computer device data defining the first screenshot to determine at least one candidate user interactive area in the screenshot, a user interactive area being one which is responsive to user input when the computer application is run; causing at least one processor of the computer device to attempt to interact with the determined at least one candidate user interactive area; capturing by at least one processor of the computer device data defining another screenshot of an image caused to be to be displayed on a display of the device by the computer application in response to the attempt to interact with the determined at least one candidate user interactive area; and comparing by the at least one processor of the computer device the first screenshot with the further screenshot to determine if the respective candidate user interactive area is an interactive are According to another aspect, there is provided a computer apparatus comprising at least one processor and at least one memory including computer code for one or more programs, the at least one memory and the computer code configured, with the at least one processor, to cause the apparatus at least to: analyse data defining the first image which is displayable when a computer application runs to determine at least one candidate user interactive area in the image, a user interactive area being one which is responsive to user input when the computer application is run; cause an to attempt to interact with the determined at least one candidate user interactive area; and compare the data defining the first image with data defining a further image to determine if the respective candidate user interactive area is an interactive area.

The at least one memory and the computer code may be configured, with the at least one processor, to cause the apparatus to cause the further image to be displayable in response to the attempt to interact with the determined at least one candidate user interactive area The at least one memory and the computer code may be configured, with the at least one processor, to cause the apparatus to run the computer application on at least one of the computer apparatus and at least one processor of another computer device.

The at least one memory and the computer code may be configured, with the at least one processor, to cause the apparatus to capture at least one of the data defining the first image and the further image.

The at least one memory and the computer code may be configured, with the at least one processor, to cause the apparatus causing at least one of the first image and the further image to be displayed on a display of the computer apparatus.

The at least one memory and the computer code may be configured, with the at least one processor, to cause the apparatus to determine if the respective candidate area is an interactive area by determining a similarity between the first and further images.

The at least one memory and the computer code may be configured, with the at least one processor, to cause the apparatus to determine if the respective candidate area is an interactive area by determining if the first and further images are substantially different.

The at least one memory and the computer code may be configured, with the at least one processor, to cause the apparatus to carry out the above steps for a plurality of different images displayable when the computer application runs to provide a tree relationship between the different images which is displayable.

The at least one memory and the computer code may be configured, with the at least one processor, to cause the apparatus to store the tree relationship.

The at least one memory and the computer code may be configured, with the at least one processor, to cause the apparatus to subsequently generate a further tree relationship.

The at least one memory and the computer code may be configured, with the at least one processor, to cause the apparatus to analyse the tree relationship to determine one or more anomalies.

The at least one memory and the computer code may be configured, with the at least one processor, to cause the apparatus to compare at least a part of the provided tree relationship with a corresponding reference tree relationship to determine one or more anomalies.

The tree relationship may be a tree structure.

The at least one memory and the computer code may be configured, with the at least one processor, to cause the apparatus to carrying out the above steps for a plurality of different images displayable when the computer application runs to provide a hierarchal relationship between the different images which is displayable The at least one memory and the computer code may be configured, with the at least one processor, to cause the apparatus to store the hierarchal relationship.

The at least one memory and the computer code may be configured, with the at least one processor, to cause the apparatus to subsequently generating a further hierarchal relationship.

The at least one memory and the computer code may be configured, with the at least one processor, to cause the apparatus to analyse the hierarchal relationship to determine one or more anomalies.

The at least one memory and the computer code may be configured, with the at least one processor, to compare at least a part of the provided hierarchal relationship with a corresponding reference hierarchal relationship to determine one or more anomalies.

The at least one memory and the computer code may be configured, with the at least one processor, to provide at least one file, the at least one file comprising data defining a plurality of different images displayable when the computer application runs.

The at least one memory and the computer code may be configured, with the at least one processor, to analyse data defining one or more of a plurality of different images displayable when the computer application runs to determine an error condition.

The error condition may comprise one or more of missing text information and missing texture information.

According to another aspect, there is provided a computer apparatus comprising at least one processor and at least one memory including computer code for one or more programs, the at least one memory and the computer code configured, with the at least one processor, to cause the apparatus at least to: run on a computer application; capture data defining a first screenshot of an image caused to be displayed on a display by the computer application; analyse data defining the first screenshot to determine at least one candidate user interactive area in the screenshot, a user interactive area being one which is responsive to user input when the computer application is run; attempt to interact with the determined at least one candidate user interactive area; capture data defining another screenshot of an image caused to be to be displayed on the display in response to the attempt to interact with the determined at least one candidate user interactive area; and compare the first screenshot with the further screenshot to determine if the respective candidate user interactive area is an interactive area.

According to some aspects, there is provided a program product comprising a computer-readable storage device including a computer-readable program for providing a computer-implemented game, wherein the computer-readable program when executed on a computer causes the computer to perform any one or more of the method steps described previously.

According to another aspect, there is provided a computer readable non-transitory storage medium carrying one or more computer executable instructions which when run on at least one processor cause:

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

BRIEF DESCRIPTION OF DRAWINGS

To understand some embodiments, reference will now be made by way of example only to the accompanying drawings, in which.

DETAILED DESCRIPTION OF SOME EMBODIMENTS

In the following description of various embodiment, reference is made to the accompanying drawings which form part thereof, and in which is shown by way of illustration various implementations in which some embodiments may be utilized. It is to be understood that the other implementations may be utilized, and structural and functional modifications may be made without departing form the scope of the present invention.

In the following embodiments, reference is made to a gaming app. It should be appreciated that this is by way of example and other embodiments may be used with any other suitable app. Some embodiments may be used with an app where navigation between different screens is provided via activatable areas. The activatable areas may be activated by a user touching the area in the case of a touch screen display, by a mouse click or in any other suitable way.

These activatable areas may be represented as "buttons" or in any other suitable manner.

Figure 1:
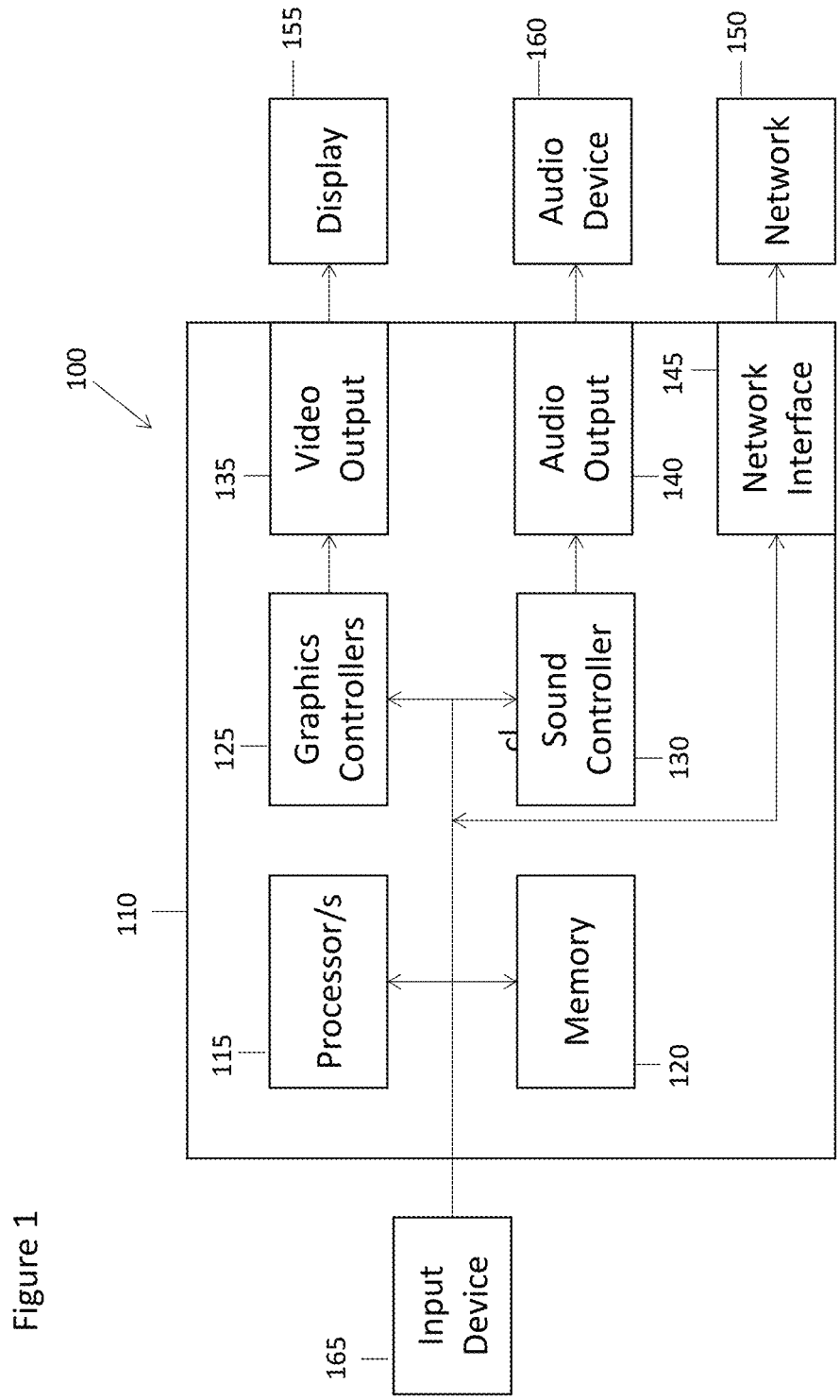
FIG. 1 shows an example client or user device.

A schematic view of a computer device 100 according to an embodiment is shown in FIG. 1. The computer device may be a computer device of the type on which the app is to be deployed or may be computer device on which app is installed to be verified. All of the blocks shown are implemented by suitable circuitry. The blocks may be implemented in hardware and/or software. The computer device may have a control part 110 which may be provided by one or more processors 115 and at least one memory 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The video output 135 is provided to a display 155.

The controller 110 has an interface 145 allowing the device to be able to communicate with a network 150 such as the Internet or other communication infrastructure. This may be optional is some embodiments.

The sound controller 130 is configured to provide an audio output 140. The audio out 140 is provided to an audio device 160 such as a speaker and or earphone(s). This may be optional is some embodiments.

The device 100 has an input device 165. The input device can take any suitable format and can be one or more of a keyboard, mouse, touch screen, joystick or game controller.

It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller may be implemented by one or more integrated circuits, at least in part.

The computer device 100 is shown by way of example only. In alternative embodiments, one or more of the parts may be omitted. Alternatively or additionally, some embodiments may comprise one or more other parts. Alternatively or additionally, one or more parts may be combined.

In some embodiments, an app may be installed and run on the controller 110.

Figure 2A:
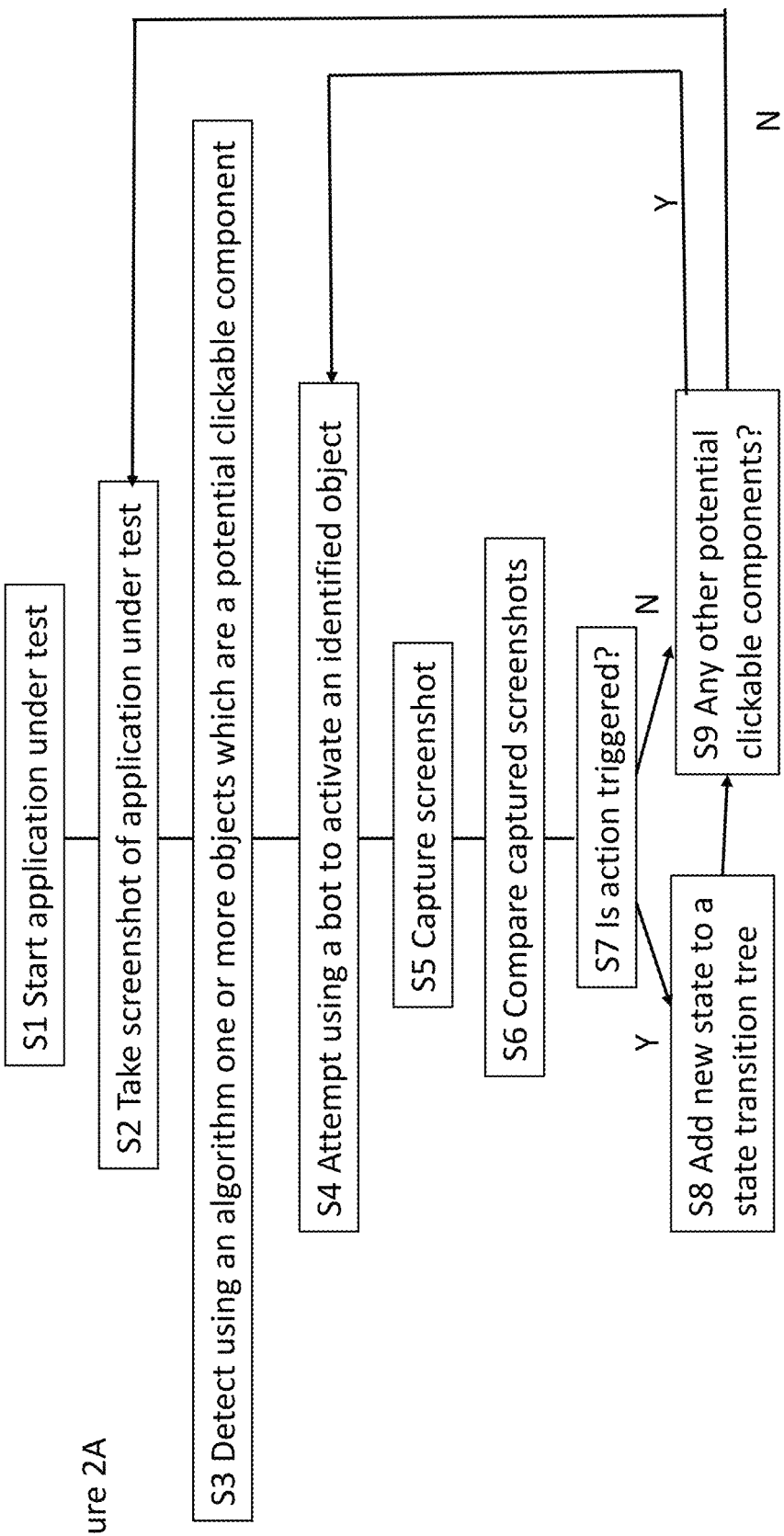
FIG. 2A shows a method of some embodiments.

Reference is made to FIG. 2A which shows a method of some embodiments.

In step S1, the application under test is started. The application under test may be run on a computer device such as described in relation to FIG. 1 or any suitable computer device.

The test may be started by a test tool provided by a computer implemented program running on at least one processor of the computer device.

In step S2, the test tool comprises computes program instructions which are configured to cause a screenshot of the application under test to be taken. The screenshot may be taken by a bot. The bot may be provided by the computer program instructions running on the at least one processor of the computer device. The bot may be software application that is configured to run tasks or scripts. However, it should be appreciated that any other software application can be used to capture the screen shot of the application under test. The captured screenshot is an image that would be displayed by the app which is being tested on the display.

In step S3, an algorithm is used to analyse the image captured in the screen shot. In particular, the algorithm is configured to detect one or more candidate objects which are potential clickable components. A clickable component represents an active area which when selected by a user would cause an action to be performed by the application. The potential clickable components may be potential GUI (graphical user interface) components. In some embodiments a clickable component may be a button or the like.

Figure 8:
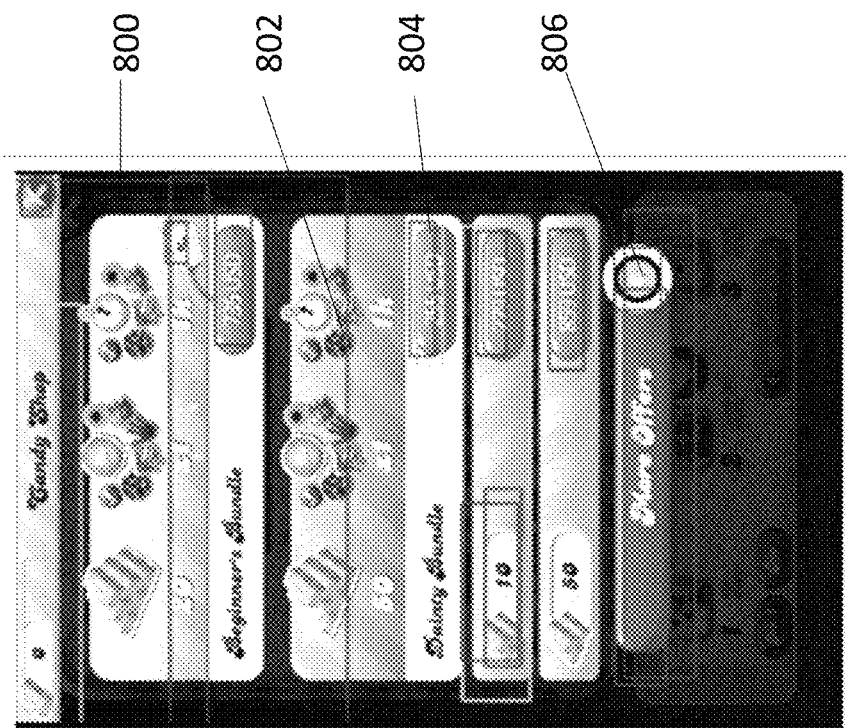
FIG. 8 schematically shows an analysis of an image in some embodiments to identify one or more activatable areas.

In this regard, reference is made to FIG. 8 which schematically shows how the algorithm analyses the images. FIG. 8 shows an example image 800. As can be seen, various different borders are shown around candidate areas. The candidate areas may have one or more different sizes such as candidate areas 802 and 804. One or more candidate areas may overlap with one or more other candidate areas. One or more candidate areas may be included in one or more other candidate areas.

When the algorithm analyses the image, it determines one or more candidate areas which are schematically represented by the borders. The candidate area which is currently being tested is represented by reference 806.

It should be appreciated, that the borders around the candidate areas on the screen shots may be represented graphically on a display or may only be representative of the processing carried out by the algorithm.

In some embodiments, the algorithm will first determine all the candidate areas and then will test each candidate area. Alternatively, the testing of a candidate area will start as soon as one is identified with the identification of further candidate areas in the image being carried out in parallel.

In some embodiments, data about the candidate areas and/or the results of the attempting to activate that candidate area may be stored in at least one memory.

It should be appreciated that in some embodiments, a reference library may be provided of examples of clickable components. The image may be checked by the algorithm to see if any of the objects in the library are present in the image. Alternatively or additionally, the algorithm may be configured to apply one or more rules to identify potential objects. In some embodiments, a reference library may be created by the computer program. Once an object has been determined to be a clickable component, as will be described in more detail later, that object may be added to a reference library. Accordingly, when the image is being analysed, the image may be checked for items which are in the reference library. This may for example be in addition to the application of one or more rules.

The algorithm which is used to detect candidate objects may be any suitable algorithm. Some examples of this will be discussed later. In step S4, once a potential applicable component has been identified in the screen shot, a bot of the like attempts to activate a candidate object.

In step S5, a screen shot of the application under test is taken after the attempt to activate the candidate object.

In step S6, the at least one processor may run an algorithm to compare the screen shot taken before the attempt to activate the candidate object with the screen shot taken after the attempt to activate the candidate area. If there are differences, it can be determined that object is a clickable object. It should be appreciated that in some embodiments, one or more thresholds may be applied so that slight differences between the images (for example as a result of a character being animated or the like) do not cause an object to be wrongly determined as being a clickable object. Alternatively, a machine learning process may have taken place such that images which are similar but not the same are classed as the same image. This is described in more detail below.

The at least one processor may determine if the screen shots are the same by determining the similarity between the images. The at least one processor may alternatively or additionally determine the differences between the images.

In step S7, the at least one processor is configured to determine based on the comparison if an action has been triggered as a result of the candidate area being a clickable object.

If the object is determined to be a clickable object, a new state will be added to a state transition tree in step S8. This will be described in more detail later. Information about the clickable object may be added to a reference library to facilitate the identifying of clickable objects in an image. In some embodiments, information about objects which are determined not to be clickable objects may alternatively or additionally be added to a reference library to facilitate the identifying of clickable objects and more particular determining which objects are not clickable objects. Step S8 will then be followed by step S9.

If it is determined in step S7, that no action has been triggered and that the candidate area is not a clickable area, then the next step is step S9.

In step S9, it is determined if there are any other candidate clickable objects in the in the image. If there are no further candidate clickable objects, then the method may revert to step S2. If there are further candidate clickable objects, then the method may revert to step S4.

Thus in some embodiments, the computer implemented method may comprise starting an application and taking a screen shot. The method may comprise identifying one, some or all of the available activatable areas on a screen. These activatable areas may be "buttons". The bot will activate one or more of these buttons to create a state tree of the application. In this regard, reference is made to FIG. 2B which shows an example of a state tree 200.

Figure 2B:
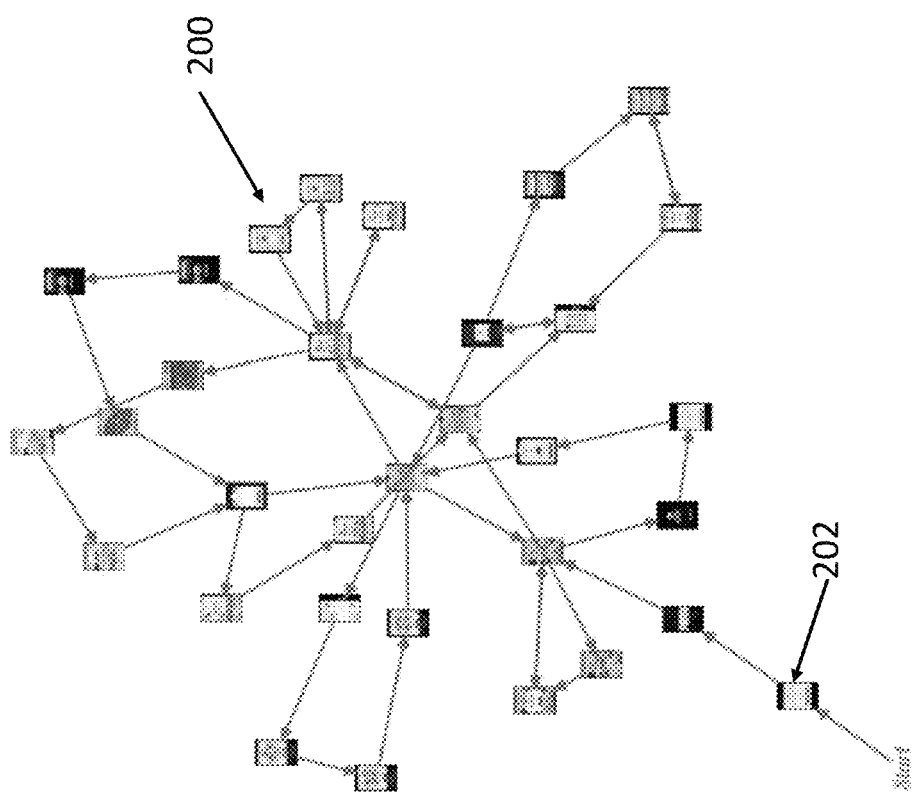
FIG. 2B shows a tree view representing navigation through different screens.

In FIG. 2B, the first screen is referenced 202. The state tree comprises a series of different image and the arrows indicate the preceding screen from which that image has been reached. Some screens can be reached from one or more other screens. Some screens can only be reached from one other screen. Some screens allow only one other screen to be accessed therefrom. Other screens allow two or more different screens to be accessed therefrom.

To recognise when a same screen has been reached but via potentially different paths, some embodiment may use a computer implemented similarity algorithm to determine if a next screen is a different screen or a screen which has been previously been reached. This algorithm is described in more detail later.

After each activation of a button or activatable are, the bot may perform test capability checks until an end test criteria is reached.

The tree relationship may be made up of nodes. Each node may represent an image or screen shot. A relationship may be established from one node with one or more other nodes. The different nodes may represent the results of interacting with different parts of an image.

In some embodiments, relationship data may be defined between one or more interactive areas and the image obtained following an interaction with that data. That relationship data may be provided as part of the tree relationship or separately.

In some embodiments the tree relationship or part of the tree relationship may be compared with a reference tree relationship. This may be compare the behaviour of an application before a modification to the behaviour after the modification. This may be to compare the behaviour of an application to an expected behaviour.

In some embodiments the tree relationship may be used for anomaly detection. A reference tree relationship may be used as a reference with which to compare at least a part of a generated tree relationship. The reference tree relationship may be a previously determined tree relationship.

The tree relationship may be stored in at least one memory. When the tree relationship is required for anomaly detection, at least a part of the tree relationship may be retrieved from memory.

In some embodiments, the tree relationship is used to steer the test bot so that a particular part of an app is tested. This may for example be used where there is an update to the app. The tree relationship can be used to steer the test bot to the new part of the code or to test the interaction of the new part of the code with the existing code.

In some embodiments, a screen shot of each unique screen may be saved in one or more files. This may be as well as or instead of data defining the hierarchical tree. This data may be used by one or more algorithms or the like when analysing one or more images to determine one or more error conditions.

Reference is now made to FIGS. 3A to 3G which show images displayed on a display of a computer device of an application under test. The application may be tested such as described previously. In this example, the application under test is a gaming app.

On the left-hand side of the displayed images and referenced 302, an application under test is shown. On the right hand side and referenced 304 are one or more screen shots taken of the application under test. The screen shots shown on the right hand side are captured from the application under test which is being run on at least one processor of the computer device and which causes the images shown on the left hand side of the display to be displayed. It should be appreciated that the relative locations of the two parts of the display be different in different embodiments. In some embodiments, the images of the application under test and the screen shots may not be displayed at the same time. In some embodiments, the screen shots may not be displayed while the application under test is being run.

In some embodiments, the data generated by the application under test which is used to control the image which is displayed on the display may be captured and analysed rather than a captured screen shot.

Figure 3A:
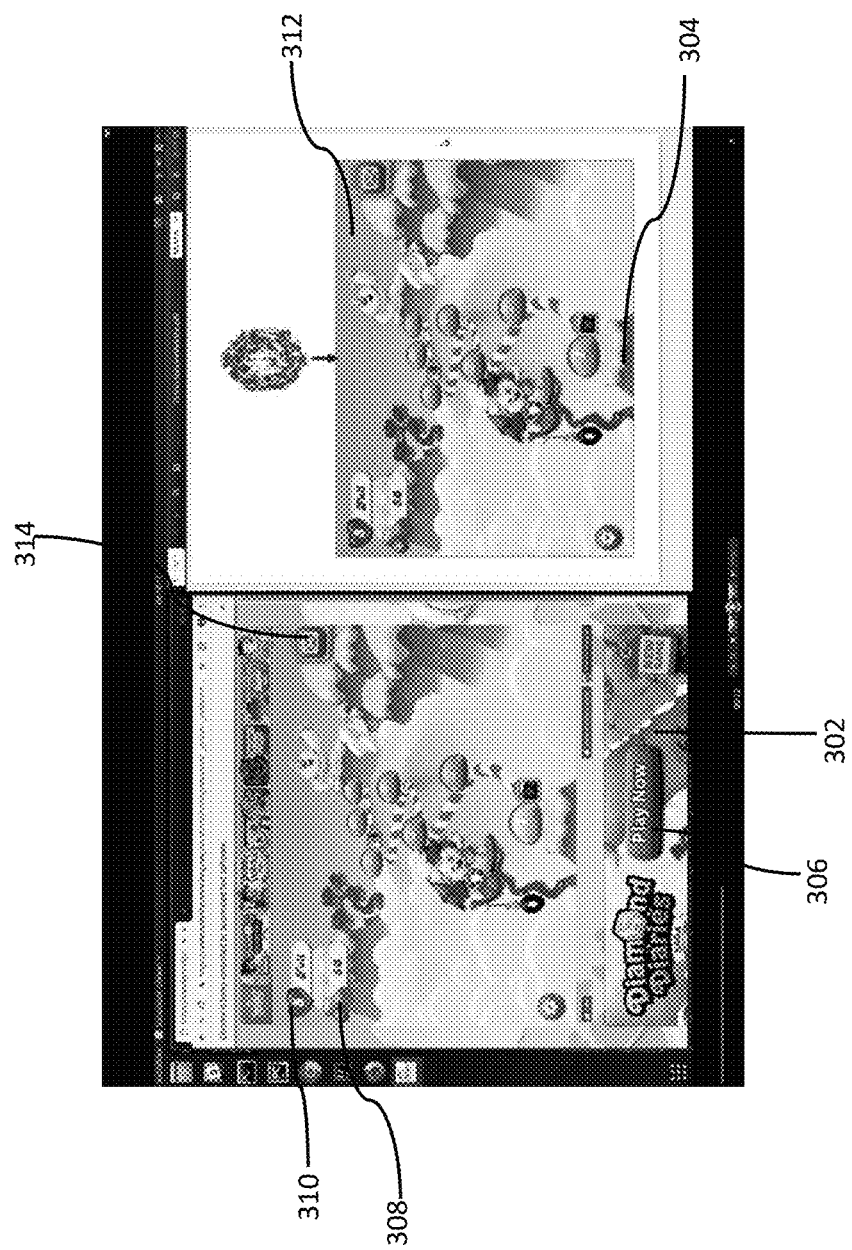
FIGS. 3A to 3G show various images displayed on a display when an application is being tested using for example the method of FIG. 2.

Reference is made to FIG. 3A which on the left hand side shows an initial image of the application under test. As can be seen, this initial image comprises a plurality of candidate clickable components. In the example shown in FIG. 3A, one candidate clickable area 306 is captioned 'Play Now'. If that candidate clickable area is selected, then the game of the gaming app will be started. Another candidate clickable area 308 is associated with an in game shop. A third candidate clickable area 310 provides information on the number of lives available at a given time to a player of the game. A fourth candidate clickable area 314 indicates if the user has messages. This is allow the user to communicate with other users of the application.

It should be appreciated that the number and type of candidate clickable areas will be dependent on the application under test and/or may depend on the progress through the application under test.

As can be seen, a screen shot 312 of the initial image of the application under test is captured and displayed on the right hand side of the display. This screen shot is taken by a bot or the like.

Figure 3B:
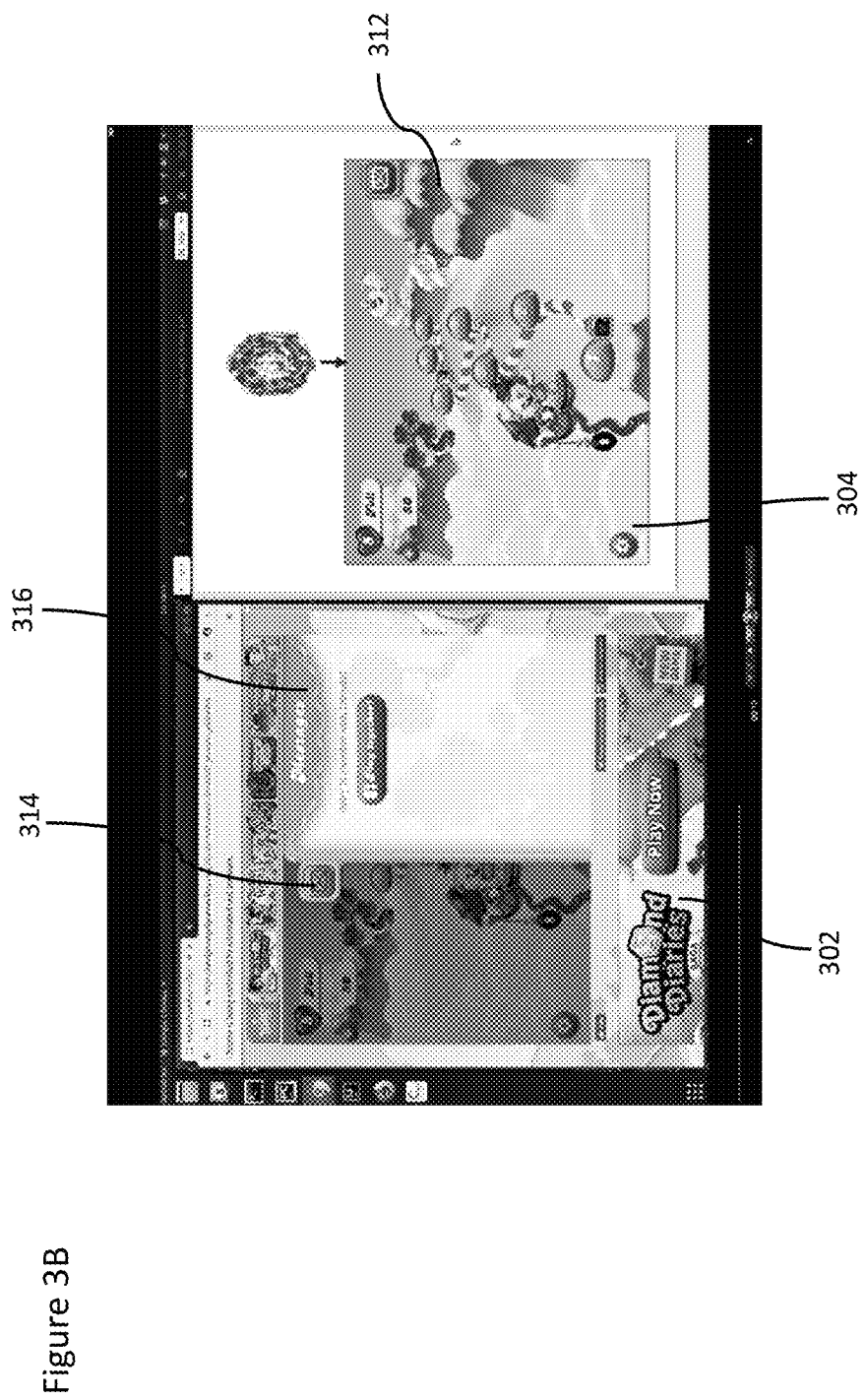

In FIG. 3B, the bot or the like has attempted to activate the fourth candidate clickable area 314. In this case the candidate clickable area is a clickable area. This causes the image displayed on the display by the application under test to superimpose a message area 316 on the image shown in FIG. 3A. In this example, this area will invite the use to connect via a social network with one or more other friends.

Figure 3C:
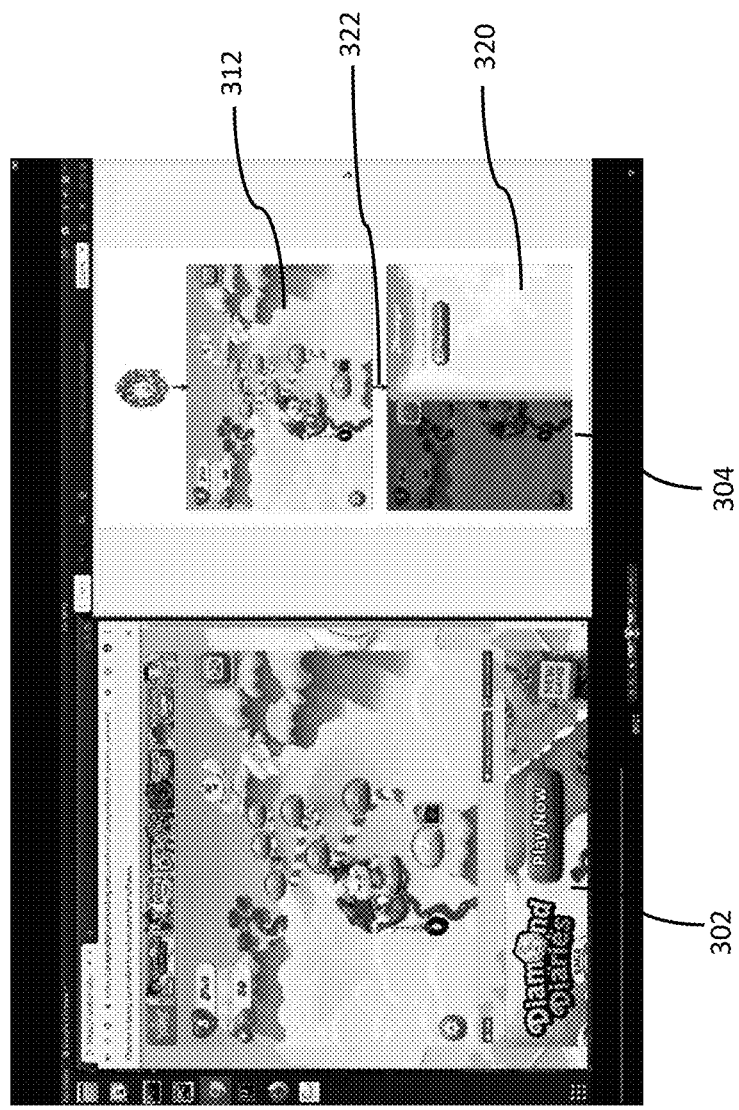

As shown in FIG. 3C, the bot or the like takes a screen shot 320 shown in FIG. 3B of the image displayed on the display by the application under test. This second captured screen shot is shown on the right hand side with the first capture screen shot. In some embodiments, only a currently captured screen shot may alternatively be shown in area 304.

As discussed in relation to FIGS. 2A-2B, an algorithm is configured to compare the second captured image with the previous image 312. The images are quite different and accordingly it will be determined that the candidate clickable area 314 is indeed a clickable area. A reference library or data store may be updated to include area 314 as being a likely clickable component.

A determination may be made that a state of the application under test may be represented by the image 312 may be followed by the state represented by image 320 when the clickable area 314 is activated. This relationship is represented by arrow 322 going from the first captured image 312 to the second captured image 320.

In some embodiments, the bot or the like may attempt to activate the clickable area 314 again to see if this changes the image displayed by the application under test. In this case, the image displayed on the display by the application under test reverts back to the image shown in FIG. 3A. Accordingly, it can be determined that there is a two-way relationship in the state represented by image 312 and image 320. This is indicated by two way arrow 322 shown in FIG. 3D.

Figure 3D:
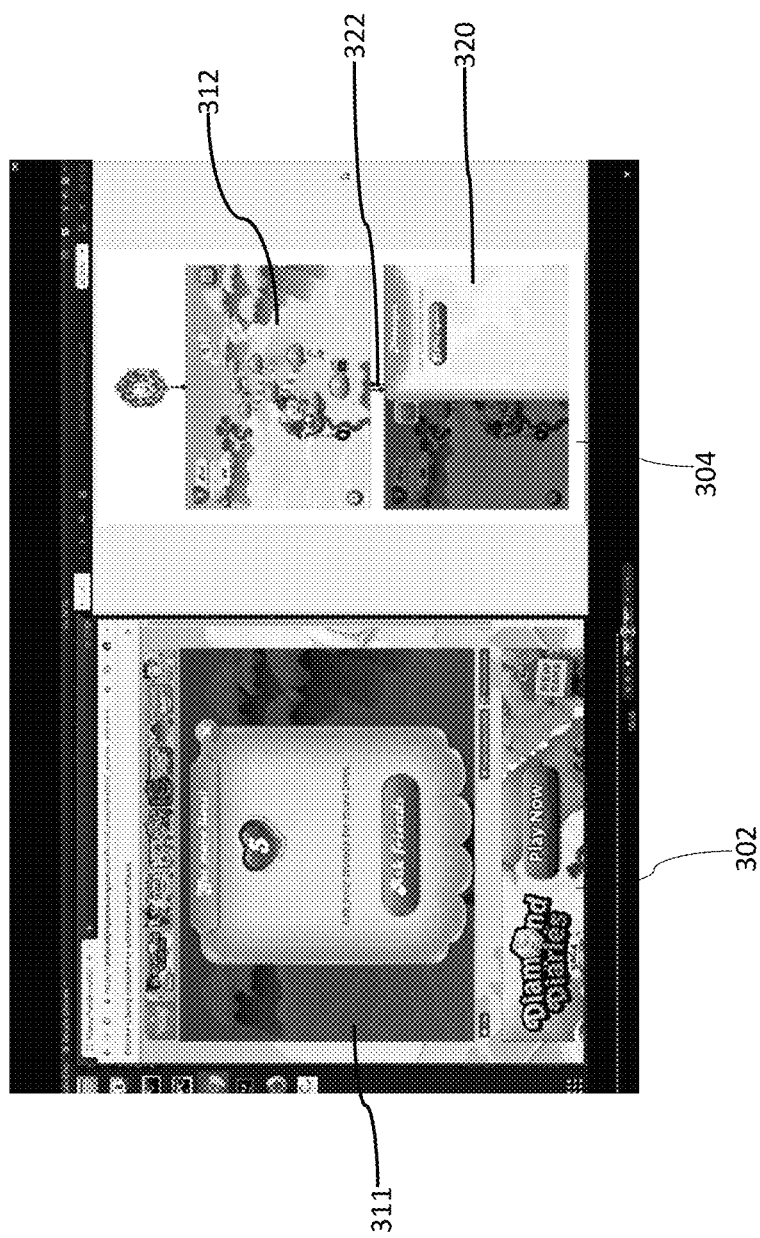

As shown in FIG. 3D, the third candidate clickable area 310 has been attempted to be activated by the bot or the like. In this case the candidate clickable area is a clickable area. This causes the image displayed on the display by the application under test to superimpose a lives area 311 on the image shown in FIG. 3A. In this example, this lives area will invite the user to ask friends for more lives.

Figure 3E:
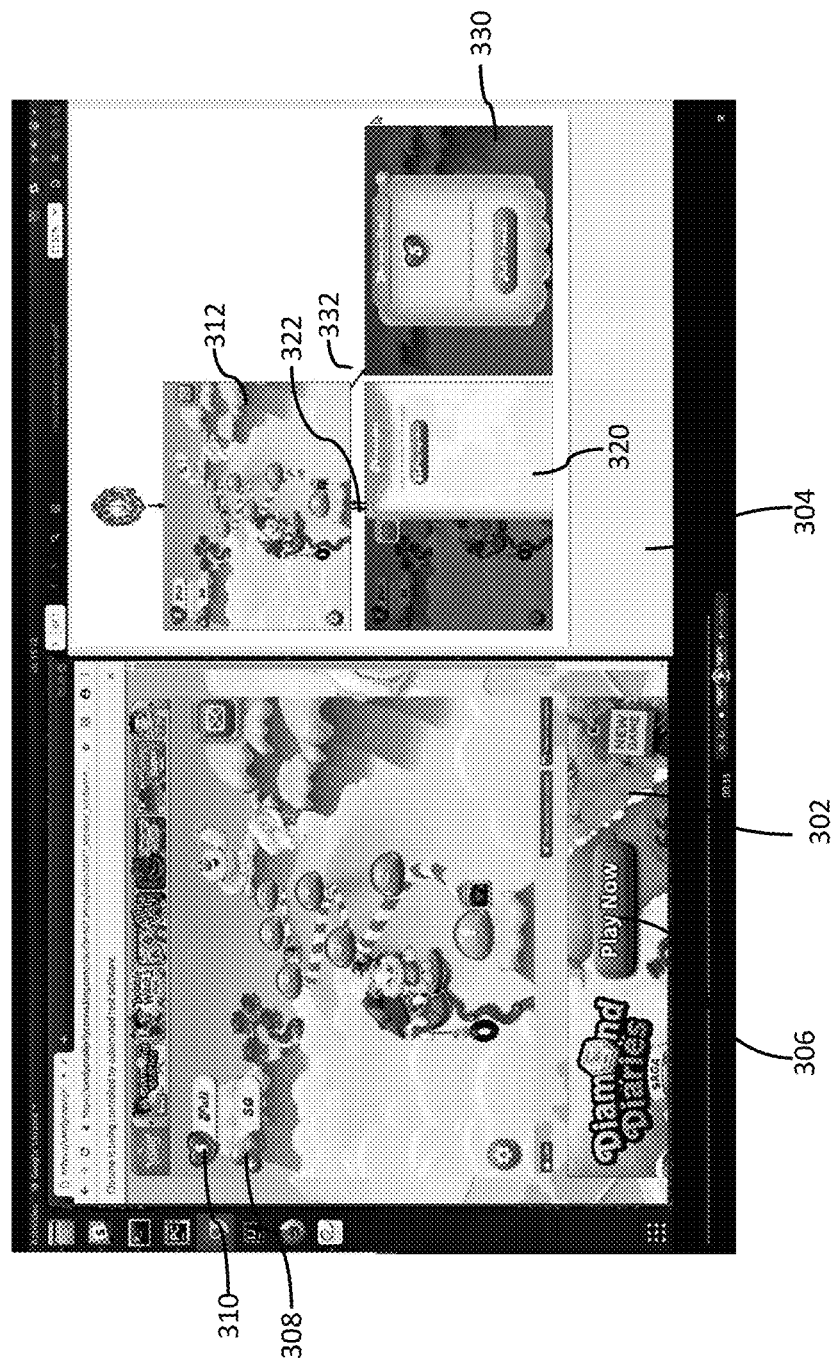

A screen shot of this image is taken and this can be seen in FIG. 3E. As shown in FIG. 3E, the bot or the like takes a third screen shot 330 of the image displayed on the display by the application under test shown in FIG. 3D. This third captured screen shot is shown on the right hand side with the first and second captured screen shots. It should be appreciated that a comparison is made between the third captured image 330 and the first captured image 312. Based on this comparison, it is determined that an action has been triggered. An arrow representing the relationship between the state represented by image 312 and the state represented by image 330 is provided from the first image 312 to the third image 330.

It should be appreciated that in a similar way as described in respect to the captured image 320, the bot or the like may attempt to activate the clickable component again to determine if there is a two-way relationship between the state represented by the third image 330 and the state represented by the first image 312. In this case there is, and this is represented by the two way arrow shown in FIG. 3F.

Figure 3F:
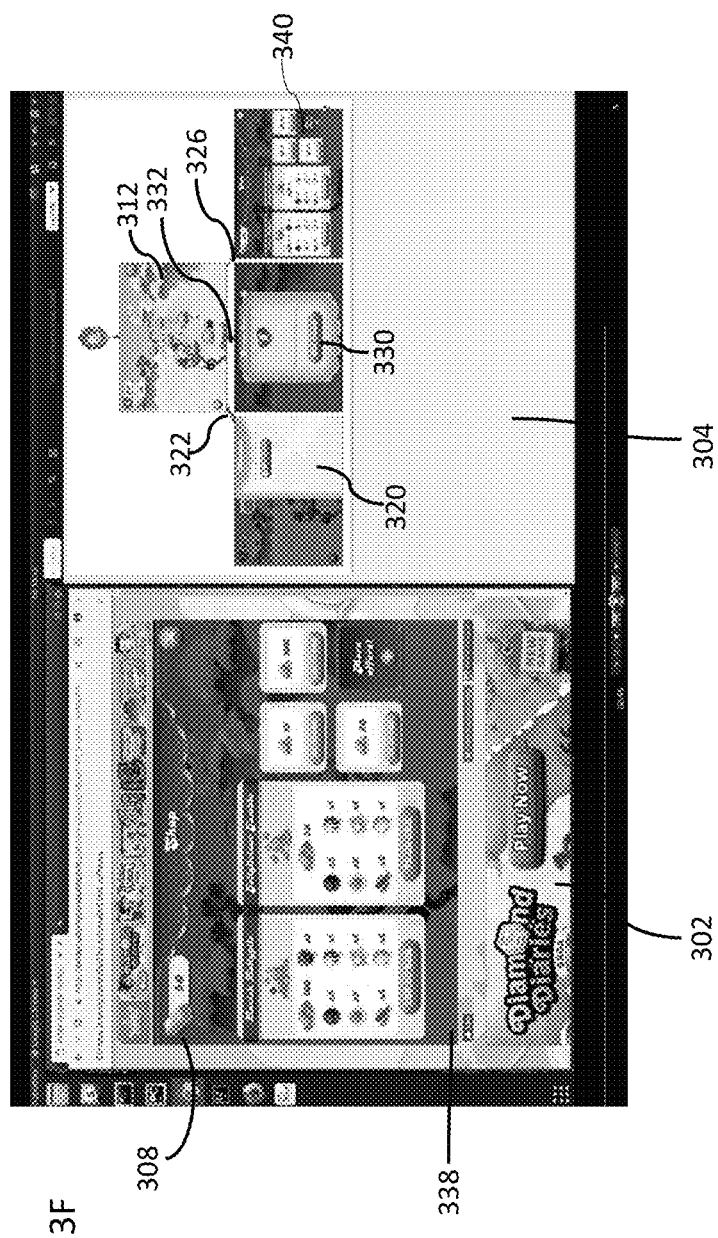

As shown in FIG. 3F, the second candidate clickable area 308 has been attempted to be activated by the bot. In this case the candidate clickable area is a clickable area. This causes the image displayed on the display by the application under test to superimpose a shop area 338 on the image shown in FIG. 3A. In this example, this shop area may allow the user to acquire various items for use in the application under test.

As shown in FIG. 3F, the bot or the like takes a fourth screen shot 330 of the image displayed on the display by the application under test shown in FIG. 3F. This fourth captured screen shot is shown with the first to third captured screen shots. It should be appreciated that a comparison is made between the fourth captured image 340 and the first captured image 312. Based on this comparison, it is determined that an action has been triggered. An arrow 326 representing the relationship between the state represented by image 312 and the state represented by image 340 is provided from the first image 312 to the fourth image 340.

Figure 3G:
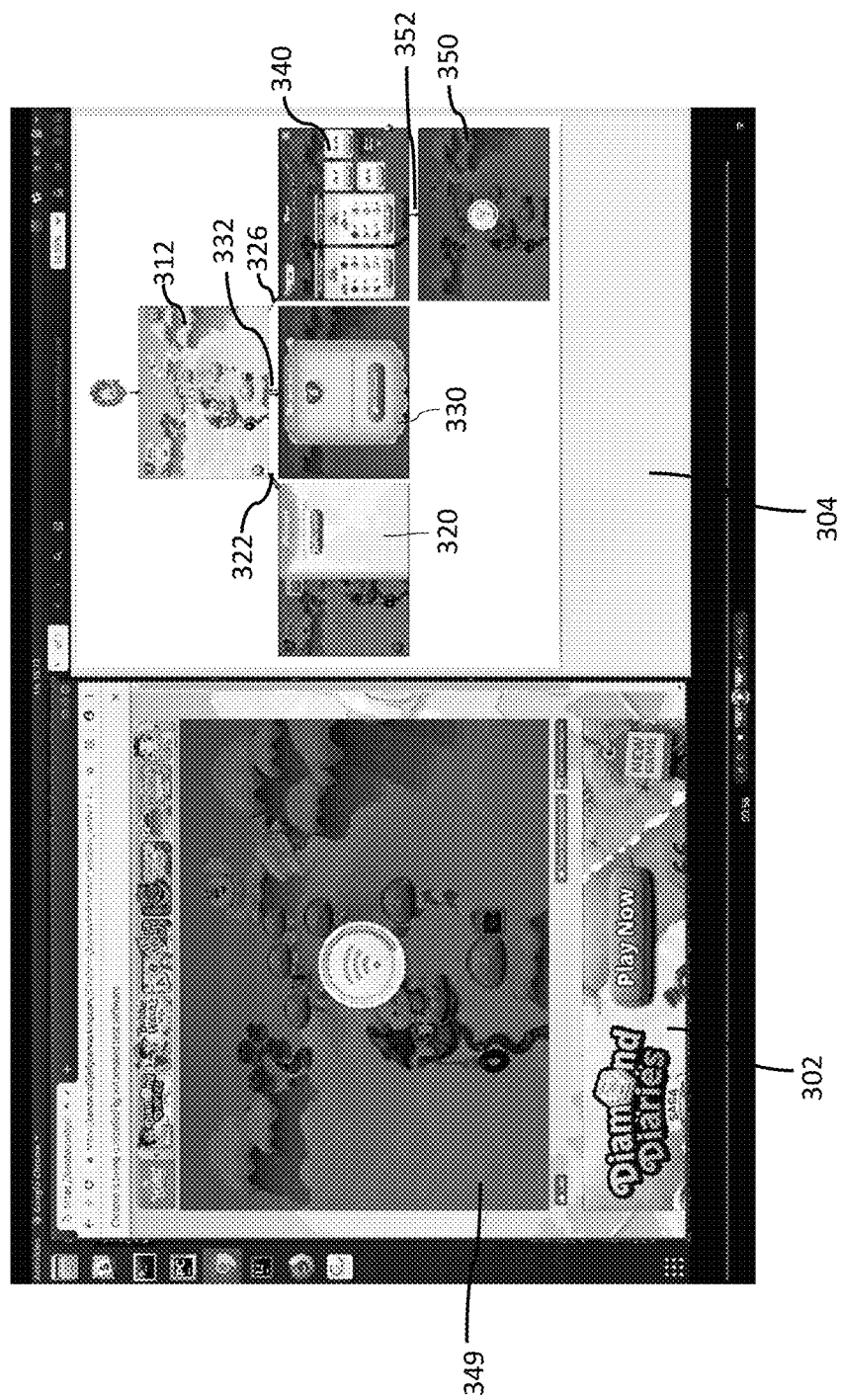

As shown in FIG. 3G, a candidate clickable area in the shop area has been attempted to be activated by the bot. In this case the candidate clickable area is a clickable area. This causes the image displayed on the display by the application under test to superimpose the transaction area 349 on the image shown in FIG. 3A. In this example, this area may indicate that a transaction is being made.

As shown in FIG. 3G, the bot or the like takes a fifth screen shot 350 of the image displayed on the display by the application under test shown in FIG. 3G. This fifth captured screen shot is shown with the first to fourth captured screen shots. It should be appreciated that a comparison is made between the fourth captured image 340 and the fifth captured image 350. Based on this comparison, it is determined that an action has been triggered. An arrow 352 representing the relationship between the state represented by image 340 and the state represented by image 350 is provided from the fourth image 340 to the fifth image 350.

In some embodiments, there may be a limit on the number of screen shots which are displayed on the display at a given time.

In some embodiments, the state transition tree (for example such as shown in FIG. 2B) represented by the screen shots and the arrows may be used to test modifications made to the app under test and/or the performance on the app on different devices and/or the migration of the app from one software operating system to another and/or to carry out one or more tests with respect to the application under test.

For example, in some embodiments, a computer implemented tester may create a test case by selecting a state in the created state tree. The computer implemented tester may specify a type of test to perform for that state. For example, this may be to visit all sub states associated with that state, visit random sub states, or visit all combinations of sub states).

In some embodiments, the data which is obtained by the computer implemented method outlined in relation to FIG. 2A and FIG. 2B may be further analysed to determine one or more different types of errors in the image data.

In some embodiments, a pattern recognition function may be used. The pattern recognition function may be provided by one or more of an algorithm, artificial intelligence AI and a machine learning. For example some embodiments may use a MSER feature detector (maximally stable extreme all regions). Some embodiments may use deep learning to train an AI model to recognise one or more of different screens and the activatable areas on the screens.

Figure 4:
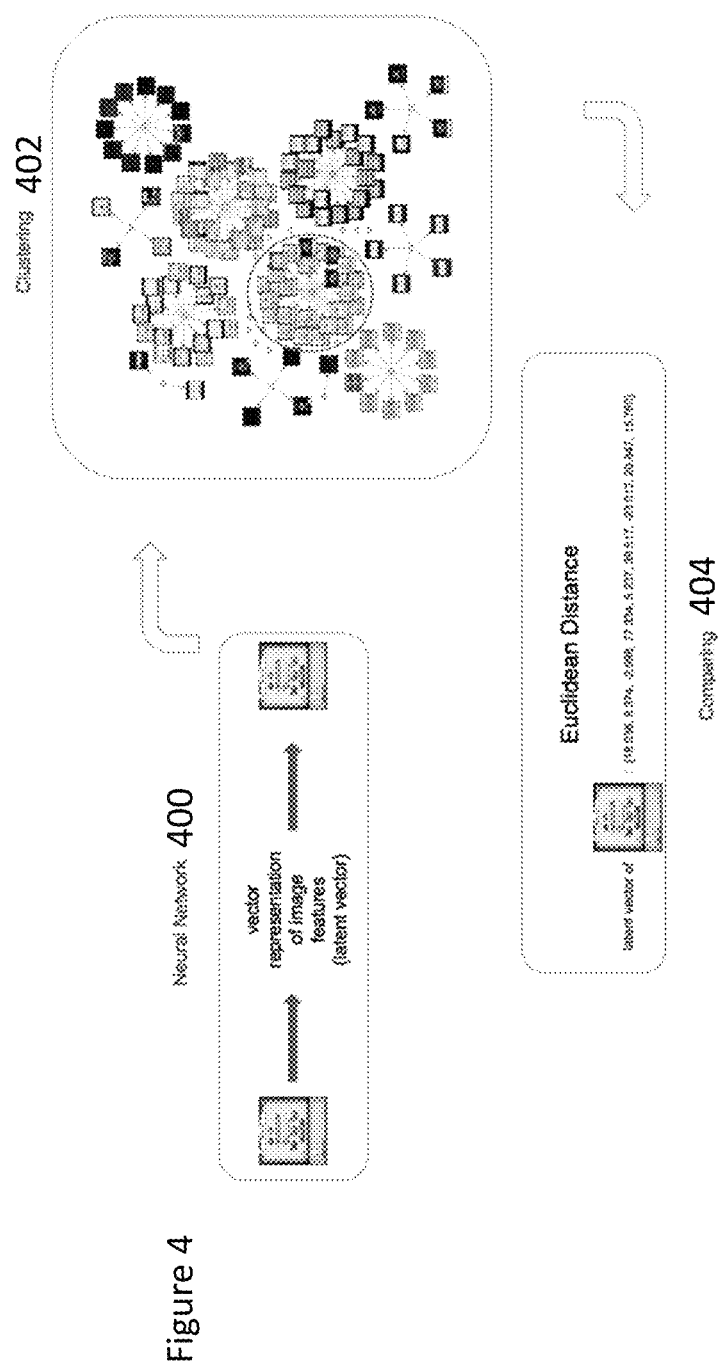
FIG. 4 schematically shows an approach for determining image similarity.

Reference is made to FIG. 4 which schematically shows an algorithm which determine similarity of different images (for example the screens and/or the activatable areas).

In some embodiments, to train the algorithm, the neural network 400 is provided with vector representations or other suitable representations of image features. A vector image is one which can be regarded as being defined in terms of 2D points which are connected by line and curves to form polygons and other shapes. Each of these points has a definite position on the x- and y-axis of the work plane and determines the direction of the path. Each path may have one or more properties such as values for stroke colour, shape, curve, thickness, and fill. Some embodiments may use latent vectors.

The training set may be augmented by creating variants of the original data. These variants may comprise changes in one or more of the scale, rotation and colour of the image.

Clustering 402 may be used. Image features which are similar are clustered. Clustering is a data analysis technique which is one technique used for pattern or feature recognition for example. It should be appreciated that in other embodiments, different techniques to clustering may be used. The clustering identifies some of the inherent features present in a set of images based on a similarity measure. Clustering analysis or clustering will group the set of images in such a way that images in the same group or cluster are more similar to each other than to those in other groups or clusters.

A comparing 404 can be used to determine whether an image belongs to a particular cluster using any suitable metrics such as for example a Euclidean distance metric. It should be appreciated that if a received image is classified as belonging to particular cluster that image can further be used for training or improving the neural network learning.

This is used to determine when the same screen is displayed so that the tree structure of, for example, FIG. 2B can be provided.

It should be appreciated that the arrangement of FIG. 4 can be trained to recognise similar images as the same image.

Figure 5B:
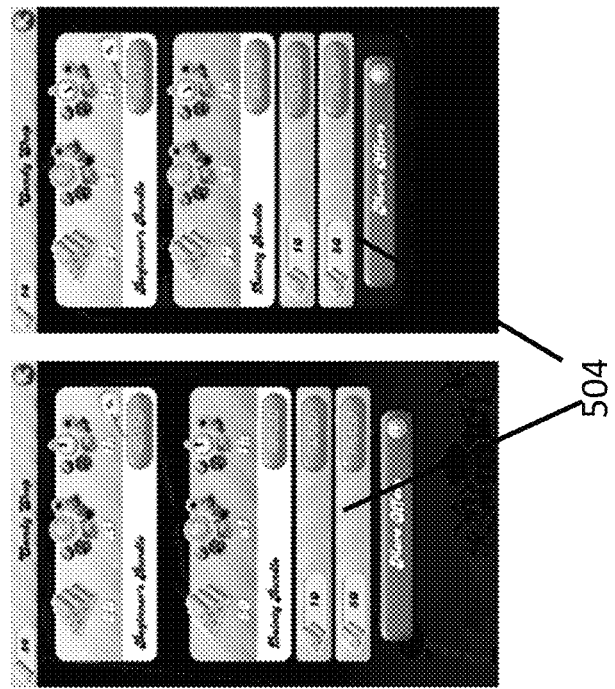
FIGS. 5A to 5D show pairs of slightly different images which would be recognized as similar images in some embodiments.
Figure 5A:
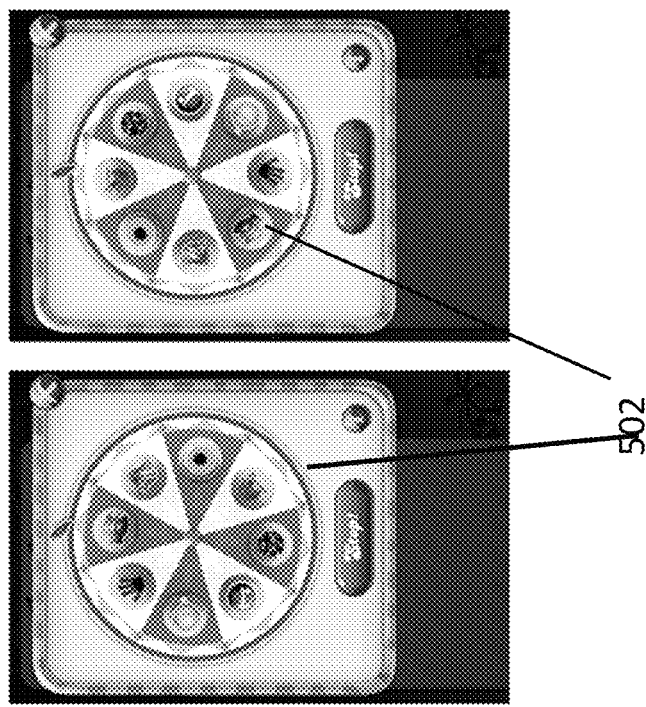

Reference is made to the pair of images FIG. 5A which are similar but not identical. The two images shown in FIG. 5A represent different positions of a rotating wheel 502. These two images would be recognised as being the same image. This means that these images would be represented by a single entry in the hierarchical tree.

Reference is made to FIG. 5B which shows a pair of images where a superimposed image 504 in both images has the same content. The image has a similar overall layout in both images but the spacing and size of some of the parts of the image differ slightly. These two images would be recognised as being the same image. This means that these images would be represented by a single entry in the hierarchical tree.

Figure 5D:
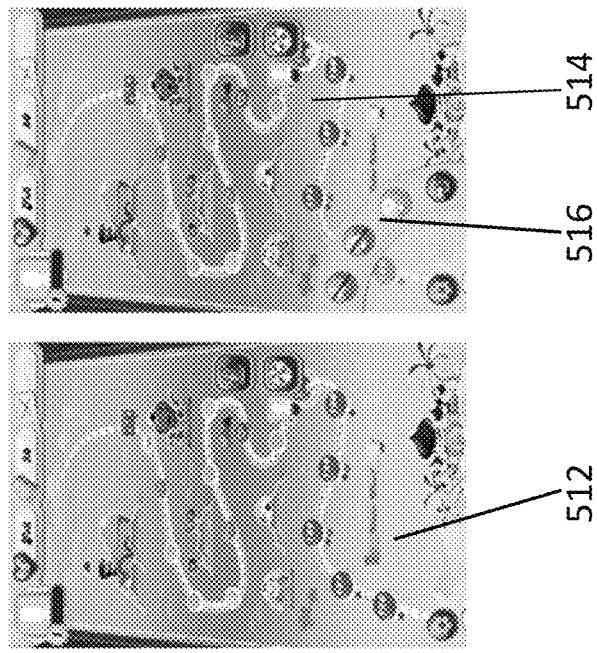
Figure 5C:
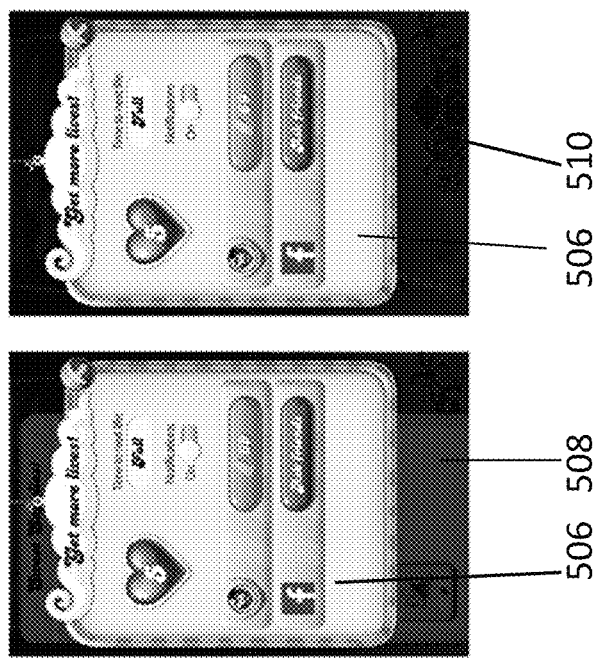

Reference is made to FIG. 5C which shows a pair of images which would be recognised as being the same image. This means that these images would be represented by a single entry in the hierarchical tree. In this example the image 506 shown in each screenshot is on a different background 508 and 510 respectively.

FIG. 5D shows another example which shows a pair of images which would be recognised as being the same image. This means that these images would be represented by a single entry in the hierarchical tree. In FIG. 5D, the first image 512 shows a part of a so-called saga map of a game. In the image shown in 514, an option selection area 516 is superposed over the image of the same part of the saga map. This option selection area 516 allows the user to select one or more options.

In some embodiments, one or more of the screen shots may be analysed in a computer implemented method to determine if one or more error conditions are present.

In some embodiments, the screens shots may be analysed to determine if one or more of the screen shots have missing textures. In this regard, an AI or machine learning approach may be taken so that the characteristics of a missing texture can be recognised. In some implementations, the missing texture will have any specific appearance.

Figure 6B:
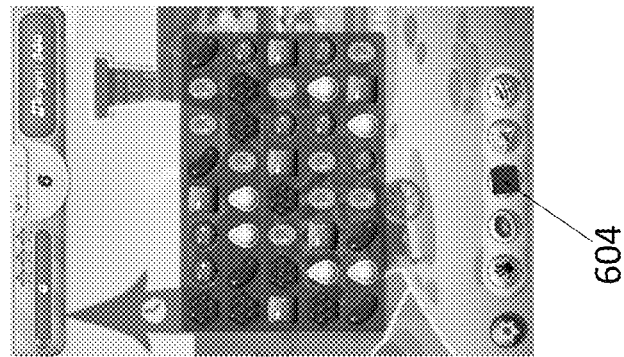
FIGS. 6A and 6B show images from which missing textures may be identified in some embodiments.
Figure 6A:
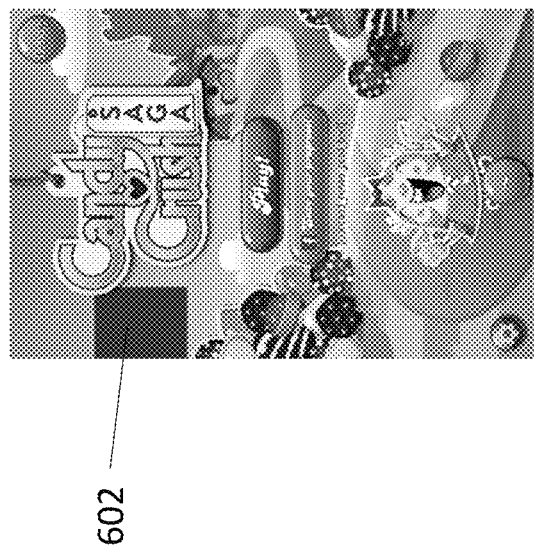

In the example shown in FIG. 6A the missing texture 602 is shown as a block. This block may be of a particular colour depending on the design of the game.

FIG. 6B shows a second block 604 which also comprises a missing texture. This block may be of a particular colour depending on the design of the game.

The algorithm may be configured to detect these missing textures. When a candidate missing texture is detected, an error message or output may be generated. The generated error message or output may be displayed on a display or output as a data output to another computer device.

In some embodiments, the screens shots may be analysed to determine if one or more of the screen shots have missing text. In this regard, an AI or machine learning approach may be taken so that the characteristics of a missing text can be recognised.

Figure 7A:
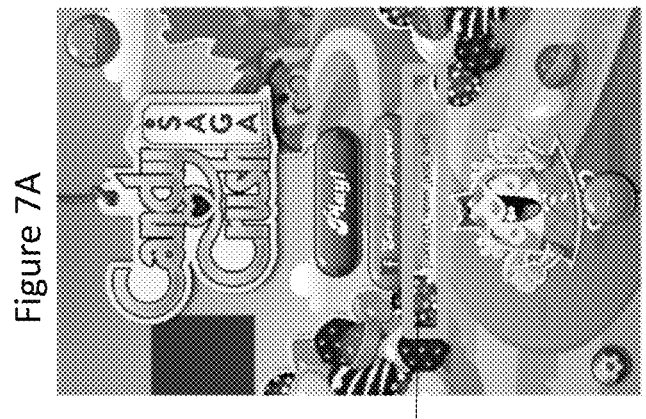
FIGS. 7A and 7B show images from which missing text may be identified in some embodiments.

In the example shown in FIG. 7A the missing text 702 is surrounded by a border. This border is not present in the screen shot itself.

Figure 7B:
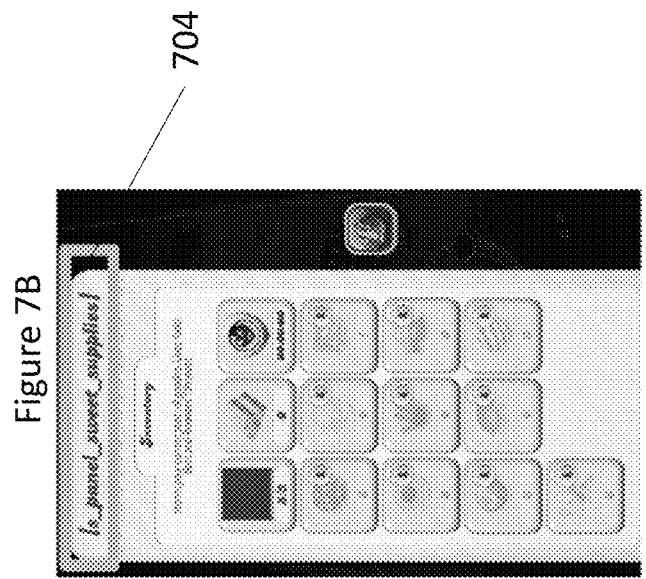

In the example shown in FIG. 7B the missing text 704 is surrounded by a border. Again this border is not present in the screen shot itself.

In some embodiments, the computer implemented tester may create a test case which requires the traversal of the application under test to a particular state or screen. This may be from one or more defined starting states or screens or from any state or screen. One or more conditions may be imposed on the test case. For example, the test case may require one or more of a maximum number of steps, a defined number of steps, a minimum number of states or screens. Alternatively or additionally, the test case may define one or more specific intervening states or screens, a direct traversal of states or screens, a random traversal of states or screens, or the like. Alternatively or additionally, the test case may require the traversal to be completed within a specified time.

Some embodiments may make use of endpoints implemented in the app. The endpoints may be implemented as HTTP endpoints.

The endpoints may be provided in a computer implemented game. In some embodiments the game may comprise a series of different levels which can be individually played and selected. That level can be satisfied (e.g. won) or not (e.g. lost). In some embodiments, it may be desirable to skip to the end of the game of a level without requiring that level to be played by the bot. According, the computer apparatus is configured to use these endpoints to traverse the game of a level without requiring the computer apparatus to play the game.

Endpoints may alternatively or additionally be used for features relating to related applications such as interactions with a social media network.

In other apps, the endpoints may be used to traverse or skip part of the code.

Some embodiments may have the facility to enable and disable features in the client. The client registers features or "plugins" by code. At start-up and/or periodically the client requests from the server, the enabled features.

In some embodiments, features of the client can be switched on and off via the client.

In some embodiments, during the build of the client a feature can be turned on and off.

In some embodiments, the system may enable/disable features. This may provide for faster and more accurate testing. For example the testing bot may be configured to enable or disable features.

For example, the system or bot may be configured to disable certain features during a testing process.

Some embodiments may associate certain features or plugins with given parts of the tree structure. In some embodiments, testing may comprise ensuring that that one part of the tree structure is tested. Some embodiments may therefore disable certain features and enable only those features corresponding to the part of the tree structure to be tested. The bot may interact with the client to cause a feature to be enable or disabled. At different times, the bot may control a feature to be enabled or disabled. This may depend on the test which is being performed by the bot Some features may only be activated at particular time. For example, some games may have a mode which is not always available. That mode may for example be to provide a different game for a time limited period or a time specific period without affecting the other parts of the game. In some embodiments, that mode may relate to a pop-up. In some embodiments, this mode can be disabled during the testing. This mode may be disabled by the bot or caused to be disabled by the bot. This means that when testing, a comparison may be made with a previously generated tree or at least part of the tree to more accurately determine if there is an error or unexpected behaviour. Features which might be disabled may be pop up features in some embodiments. In some embodiments features relating to information notices such as terms of service may be disabled The disabling and/or enabling of certain features may allow a test to be focussed on one or more particular parts of the code by ensuring that the other features of the code are disabled. Those other parts of the code which are disabled may be unrelated to the currently tested part of the code. This may allow the testing to be performed more quickly. For example this may allow features which are outside the scope of the feature which is being tested to be disabled.

In some embodiments, features outside the tree structure may be disabled.

In some embodiments, the features which are disabled may be unrelated to the screens which are be traversed by the bot. For example, the test may be focussed on one or more features. The bot may be configured to test the features which provide screens which allow the features to be accessed or activated.

Features which are known to be stable may be disabled. For example, when an app is started one or more checks may be made with social networks, or terms or service or any other such features. These features may be disabled by the bot during the test in some embodiments.

In some embodiments, the bot may be controlled to start or run a test from a particular node on the tree. The nodes which are not to be tested may be disable by the bot.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

A person skilled in the art will realise that the different approaches to implementing the game is not exhaustive, what is described herein are certain preferred embodiments. It is possible to implement the way in a number of variations without departing from the scope of the invention as claimed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer implemented method to identify interactive areas in an image comprising:
    analysing by at least one processor of a computer device data defining the first image which is displayable when a computer application runs to identify at least one candidate user interactive area in the image, a user interactive area being one which is responsive to user input when the computer application is run allowing navigation from a first screen of the computer application to a second screen of the computer application;
    causing at least one processor of the computer device to attempt to interact with the identified at least one candidate user interactive area; and
    comparing by the at least one processor of the computer device the data defining the first image with data defining a further image, displayed following the attempt to interact with said identified at least one candidate user interactive area, to identify if the respective candidate user interactive area is an interactive area,
    wherein when there is a threshold difference between the data defining the first image and the data defining the further image, the candidate interactive area is identified as an interactive area and the method further comprises:
    in response to identifying the candidate interactive area as an interactive area, updating a tree relationship for the computer application to add a relationship between the first image and the further image to the tree relationship, and
    wherein when there is less than a threshold difference between the data defining the first image and the data defining the further image, the candidate interactive area is identified as not being an interactive area and the tree relationship is not updated.

2. The method as claimed in claim 1, comprising causing the further image to be displayable in response to the attempt to interact with the identified at least one candidate user interactive area.

3. The method as claimed in claim 1, comprising running the computer application on at least one of the at least processor of the computer device and at least one processor of another computer device.

4. The method as claimed in claim 1, comprising capturing at least one of the data defining the first image and the further image.

5. The method as claimed in claim 1, comprising causing at least one of the first image and the further image to be displayed on a display.

6. The method as claimed in claim 1, comprising carrying out the method steps of claim 1, for a plurality of different images displayable when the computer application runs to update the tree relationship to include the different images which are displayable.

7. The method of claim 6, comprising analysing the tree relationship to determine one or more anomalies.

8. The method as claimed in claim 7, comprising comparing at least a part of the tree relationship with a corresponding reference tree relationship to determine one or more anomalies.

9. The method of claim 1, comprising storing the tree relationship.

10. The method of claim 9, comprising subsequently generating a further tree relationship.

11. The method of claim 1, comprising providing at least one file, the at least one file comprising data defining a plurality of different images displayable when the computer application runs.

12. The method of claim 1 comprising analysing data defining one or more of a plurality of different images displayable when the computer application runs to determine an error condition.

13. The method of claim 12, wherein the error condition comprises one or more of missing text information and missing texture information.

14. The method as claimed in claim 12, comprising using a machine learning process when analysing data defining one or more of a plurality of different images displayable when the computer application runs to determine the error condition.

15. The method as claimed in claim 1, comprising using machine learning to provide a pattern recognition function, the analysing comprising using the pattern recognition function to recognize one or more candidate user interactive areas.

16. The method as claimed in claim 7, comprising using a machine learning process when determining if the respective candidate area is an interactive area by using said machine learning process to determine if the first and further images are to be classed as different.

17. A computer implemented method to identify interactive areas in an image comprising:
    running on at least one processor of a computer device a computer application;
    capturing by at least one processor of the computer device data defining a first screenshot of an image caused to be displayed on a display of the device by the computer application;
    analysing by at least one processor of the computer device data defining the first screenshot to identify at least one candidate user interactive area in the screenshot, a user interactive area being one which is responsive to user input when the computer application is run allowing navigation from a first screen of the computer application to a second screen of the computer application;
    causing at least one processor of the computer device to attempt to interact with the identified at least one candidate user interactive area;
    capturing by at least one processor of the computer device data defining another screenshot of an image caused to be to be displayed on a display of the device by the computer application in response to the attempt to interact with the identified at least one candidate user interactive area; and
    comparing by the at least one processor of the computer device the first screenshot with the further screenshot to identify if the respective candidate user interactive area is an interactive area;
    wherein when there is a threshold difference between the first screenshot and the further screenshot, the candidate interactive area is identified as an interactive area and the method further comprises:

in response to identifying the candidate interactive area as an interactive area, updating a tree relationship for the computer application to add a relationship between the first screenshot and the further screenshot to the tree relationship, and wherein when there is less than a threshold difference between the first screenshot and the further screenshot, the candidate interactive area is identified as not being an interactive area and the tree relationship is not updated.

18. A computer apparatus comprising at least one processor and at least one non-transitory memory including computer code for one or more programs, the at least one memory and the computer code configured, with the at least one processor, to cause the apparatus at least to:

analyse the data defining the first image which is displayable when a computer application runs to identify at least one candidate user interactive area in the image, a user interactive area being one which is responsive to user input when the computer application is run allowing navigation from a first screen of the computer application to a second screen of the computer application;

cause an attempt to interact with the identified at least one candidate user interactive area; and compare the data defining the first image with data defining a further image, displayed following the attempt to interact with said identified at least one candidate user interactive area, to identify if the respective candidate user interactive area is an interactive area, wherein when there is a threshold difference between the data defining the first image and the data defining the further image, the candidate interactive area is identified as an interactive area, and the method further comprises:

in response to identifying the candidate interactive area as an interactive area, updating a tree relationship for the computer application to add a relationship between the first image and the further image to the tree relationship, and wherein when there is less than a threshold difference between the data defining the first image and the data defining the further image, the candidate interactive area is identified as not being an interactive area and the tree relationship is not updated.

19. The apparatus as claimed in claim 18, wherein the at least one memory and the computer code are configured, with the at least one processor, to cause the apparatus to cause the further image to be displayable in response to the attempt to interact with the identified at least one candidate user interactive area.

20. The apparatus as claimed in claim 18, wherein the at least one memory and the computer code are configured, with the at least one processor, to cause the apparatus to carry out the steps of claim 17, for a plurality of different images displayable when the computer application runs to update the tree relationship between the different images which is displayable.

21. The apparatus as claimed in claim 18, wherein the at least one memory and the computer code are configured, with the at least one processor, to cause the apparatus to analyse the tree relationship to determine one or more anomalies.

22. The apparatus as claimed in claim 18, wherein the at least one memory and the computer code are configured, with the at least one processor, to cause the apparatus to compare at least a part of the tree relationship with a corresponding reference tree relationship to determine one or more anomalies.

23. A computer readable non-transitory storage medium carrying one or more computer executable instructions which when run on at least one processor cause:

analysing of data defining the first image which is displayable when a computer application runs to identify at least one candidate user interactive area in the image, a user interactive area being one which is responsive to user input when the computer application is run allowing navigation from a first screen of the computer application to a second screen of the computer application;

causing an attempt to interact with the identified at least one candidate user interactive area; and comparing the data defining the first image with data defining a further image, displayed following the attempt to interact with said identified at least one candidate user interactive area, to identify if the respective candidate user interactive area is an interactive area, wherein when there is a threshold difference between the data defining the first image and the data defining the further image, the candidate interactive area is identified as an interactive area, and in response to identifying the candidate interactive area as an interactive area, updating a tree relationship for the computer application to add a relationship between the first image and the further image to the tree relationship, and wherein when there is less than a threshold difference between the data defining the first image and the data defining the further image, the candidate interactive area is identified as not being an interactive area and the tree relationship is not updated.

* * * * *